US010669041B2

(12) United States Patent
Lozano

(10) Patent No.: US 10,669,041 B2
(45) Date of Patent: Jun. 2, 2020

(54) DEVICE FOR CREATING LUMINOUS SIGNS IN THE SPACE SURROUNDING ONE OR MORE VEHICLES

(71) Applicant: Defensya Ingenieria Internacional, S.L., Madrid (ES)

(72) Inventor: Alberto Adarve Lozano, Madrid (ES)

(73) Assignee: DEFENSYA INGENIERIA INTERNACIONAL, S.L., Madrid (ES)

( * ) Notice: Subject to any disclaimer, the term of this patent is extended or adjusted under 35 U.S.C. 154(b) by 0 days.

(21) Appl. No.: 16/332,770

(22) PCT Filed: Sep. 12, 2017

(86) PCT No.: PCT/ES2017/070606
§ 371 (c)(1),
(2) Date: Mar. 12, 2019

(87) PCT Pub. No.: WO2018/020077
PCT Pub. Date: Feb. 1, 2018

(65) Prior Publication Data
US 2019/0248508 A1    Aug. 15, 2019

(30) Foreign Application Priority Data

Sep. 13, 2016 (ES) .................................. 201631189

(51) Int. Cl.
*G06F 3/033* (2013.01)
*B64D 47/02* (2006.01)
(Continued)

(52) U.S. Cl.
CPC ............. *B64D 47/02* (2013.01); *B64D 39/00* (2013.01); *G01S 7/484* (2013.01); *G01S 17/08* (2013.01);
(Continued)

(58) Field of Classification Search
CPC .. G06F 3/033; G06F 3/02; G09G 5/08; G09G 5/00; B64D 47/02; B64D 45/00; B64D 39/00; B64D 39/06
See application file for complete search history.

(56) References Cited

U.S. PATENT DOCUMENTS 5,904,729 A * 5/1999 Ruzicka ................. B64D 39/00
244/135 A
7,472,868 B2 * 1/2009 Schuster ................. B64D 39/00
244/135 A
(Continued)

FOREIGN PATENT DOCUMENTS

EP    2230179    9/2010
EP    2336027    6/2011

OTHER PUBLICATIONS

International Search Report dated Dec. 4, 2017.
Written Opinion dated Dec. 4, 2017.

*Primary Examiner* — Pegeman Karimi
(74) *Attorney, Agent, or Firm* — William H. Honaker; Dickinson Wright PLLC

(57) ABSTRACT

The present invention details a group of focussed means to create points of light of different sizes and colours, that together form figures whose function is to create a sign in front of the eyes of a driver or operator, to provide them with certain information from a remote point. The points of light are created by the ionization of the air in different points in the space where it is desirable to create the sign in question.

9 Claims, 2 Drawing Sheets

(51) Int. Cl.
  *B64D 45/00* (2006.01)
  *B64D 39/00* (2006.01)
  *G01S 7/484* (2006.01)
  *G01S 17/08* (2006.01)
  *G01S 17/933* (2020.01)
  *G09F 19/16* (2006.01)
  *G09G 5/36* (2006.01)

(52) U.S. Cl.
  CPC ............ *G01S 17/933* (2013.01); *G09F 19/16* (2013.01); *G09G 5/36* (2013.01); *G09G 2354/00* (2013.01)

(56) References Cited

U.S. PATENT DOCUMENTS

| | | | |
|---|---|---|---|
| 2005/0269455 A1 | 12/2005 | Hewitt et al. | |
| 2006/0083427 A1* | 4/2006 | Jung | G06K 9/00201 382/201 |
| 2010/0237249 A1* | 9/2010 | Adarve Lozano | B64D 39/00 250/341.1 |
| 2015/0083864 A1* | 3/2015 | Black | B64D 39/00 244/135 A |

* cited by examiner

DEVICE FOR CREATING LUMINOUS SIGNS IN THE SPACE SURROUNDING ONE OR MORE VEHICLES

CROSS-REFERENCE TO RELATED APPLICATION

This application is a 35 U.S.C. § 371 national stage application of PCT Application No. PCT/ES2017/070606, filed on Sep. 12, 2017, which claims priority to Spanish Patent Application Serial No. P201631189, filed on Sep. 13, 2016 which are incorporated herein by reference in their entireties. The above-referenced PCT International Application was published as International Publication No. WO 2018/0020077 A1 on Feb. 1, 2018.

OBJECT OF THE INVENTION

The object of the present invention is a device for creating luminous signs in the space surrounding one or more vehicles, i.e. it endeavours to create luminous points at distinct locations in the space from one or more fixed points that we call generating points. The device, object of this invention, is placed at said points and aims at those locations where it is desired to create the specific signs.

The device, object of this invention, allows for creating certain information in any part of the space, as could be the case for in-flight refuelling or even when a vehicle wants to make an isolated movement and without prior warning.

This means that the device allows creating a sign in the space in front of the vehicle where the driver or operator can see it within their field of vision.

BACKGROUND OF THE INVENTION

Currently, vehicles' movement is regulated by using fixed, passive or luminous signs. Luminous signs can have very diverse purposes, including traffic lights, light signals with incandescent lamps or with LEDs of different forms and colours, as is the case with in-flight refuelling where positioning lights and signs share the work environment.

All these signs have a static element which is very limiting. It means that they are signals placed in defined, fixed positions where they remain for the driver of the vehicle to see them, just where they have been placed and, in this way, the driver receives help or orientation towards the regulation of their movements or actions.

Nowadays luminous panels that enable signs to notify of different actions or content, which increases their flexibility, are already used, but they still suffer from being static. This limits them to a relatively precise spatial location, even though the mobile device carrying them may be in motion.

However, when establishing certain information in any part of the space is desired, as could be the case of in-flight refuelling or even when a vehicle must carry out an isolated manoeuvre without prior warning, it is desirable to be able to create a sign in the space directly in front of the vehicle where the driver or operator can see it within their field of vision. This is not possible with any signs currently in use, and requires a change in technology and philosophy for generating such signs.

The signs proposed here as the object of this invention consists of creating luminous points in different places in space from one or more fixed points that we call generating points. The device, object of this invention, is placed at said points, and targets those locations where the specific signs to be created are wanted.

These signs would consist of either forms or colours indicating an action to be taken by the driver or information relating to their movement, or precautions to be taken into consideration at a defined point in time.

In the state of the art, the following patents related to the object of this invention are known.

US2014097968. This patent discloses a display apparatus for a vehicle that includes a virtual device for displaying images, a detection device and a device for controlling the image. The device for displaying the virtual image emits a predefined light to enable a windscreen to reflect the predefined light towards the driver's eye. The predefined light emitted is to show an image. The device for displaying the virtual image shows the image in an area that appears as a virtual image; the image appears in front of the vehicle. The detection device detects a target that is an obstacle or an intersection. The image control device shows the image so that it appears below the target in the area where it is shown and then moves the image to a position corresponding to the target to be shown, whilst at least the width of the image decreases.

US2009189753. This patent discloses a display device that is mounted in an automotive vehicle. An obstacle situated ahead of the vehicle is detected by a camera, and its characteristics, such as speed, distance, size etc. are analysed by electronic circuits. An image displaying the features of the object ahead is emitted from a liquid crystal panel. The image emitted is reflected in the windscreen, displaying a virtual image to the driver. The virtual image is shown in the form of a patch surrounding the obstacle ahead, seen through the windscreen. The ways of showing the point change in different ways, according to the degree of danger of a collision, which is defined in accordance with the time taken for the vehicle to reach the obstacle. For example, if the degree of danger of a collision is high, the point colour is red-orange and/or shines very brightly. In this way the driver can easily recognise the obstacle ahead where there is a high degree of danger of a collision.

US2011298693. This patent discloses the display method used for the device described above.

DESCRIPTION OF THE INVENTION

The device, object of this invention comprises:

Means of generating energy so that the rest of the device can function.

Means of generating a high-power, high frequency laser light.

A set of lenses for concentrating the laser light on defined points in space.

A subsystem for orientating the light emitted by the laser to direct it to different points in space.

A subsystem for processing information, responsible for:
The creation of different forms and colours for the sign to be created.
The selection, calculation, orientation and focus of the lenses on the point/s in space where the desired specific form is to be generated.

A subsystem of visual and image analysis to determine the location of the mobile device whose operator is the target of the signs created.

A subsystem of communications and remote control that allows the state of the signs generated to be known as well as to send orders regarding the signs to be generated and when. Said orders can be sent either automatically or manually.

A visual and analytical subsystem based on the use of one or more strong sensors being cameras that allow obtaining images of the work environment and of an analysis processor that, from the images obtained by the camera, determines the position in which to situate the sign to be generated.

The visual and analytical system can also be formed by one or more ToF or flight time sensors together with an analysis and control system that generates light pulses with an additional laser and determine the distance to each of the sensor pixels from the different elements of the work environment in order to, after analysis, determine where the specific sign must be generated.

Alternatively, the visual system is formed by one or more cameras together with a laser that emits a structured light using a diffraction lens, which is analysed by an analysis subsystem that, using triangulation, calculates the distances of the objects in the work environment to our camera(s) to thus determine where to position the signs to be generated.

It is also possible to configure the visual system as a combination of any of the three visual systems specified above.

The system for generating the laser may use more than one laser with its respective elements of lenses and mirrors (both together with the mechanisms that move them).

In one potential use of the device, the vehicle to which you want to send a sign to is a receiving aeroplane, in operations of in-flight refuelling, and in which the visual and analytical subsystem may coincide with that used by the tanker aeroplane to determine the position of the receiving aeroplane.

Unless otherwise indicated, all the technical and scientific elements used in this report have the meaning usually understood by a person skilled in the art to which this invention belongs. In the practice of this invention, procedures and materials similar or equivalent to those described in the report can be used.

In the description and claims, the word "comprises" and its variants do not aim to exclude other technical characteristics, additives, components or steps. For persons skilled in the art, other objects, advantages and characteristics of the invention will be partly inferred from the description and partly from the practice of the invention.

DESCRIPTION OF THE DRAWINGS

To supplement the description given and with the aim of promoting a better understanding of the characteristics of the invention, in accordance with a preferred example of a practical embodiment thereof, a set of drawings is provided as an integral part of said description in which, for merely illustrative purposes, the following has been represented.

PREFERRED EMBODIMENT OF THE INVENTION

Figure 1:
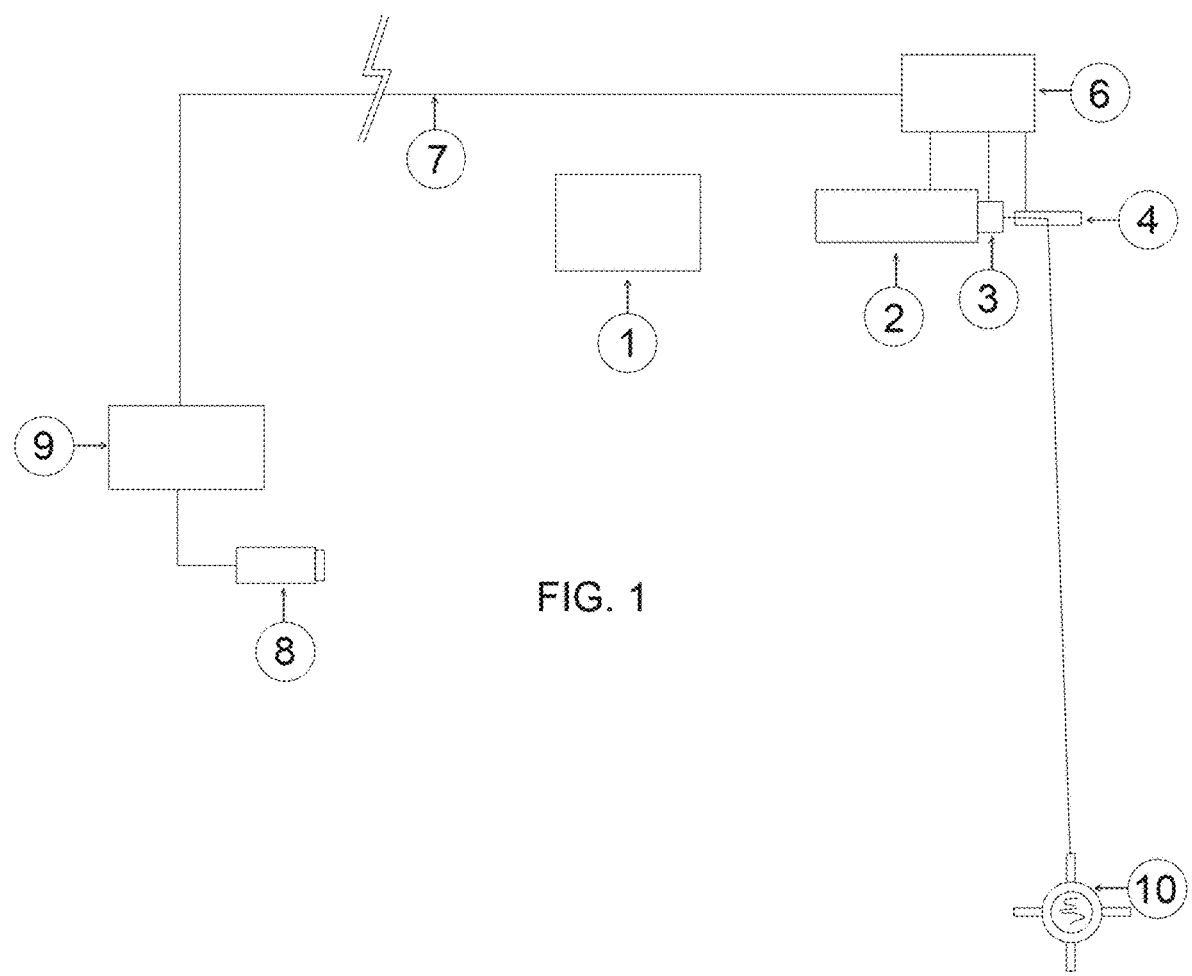
FIG. 1 represents the group of elements and main subsystems that comprise the object of this invention.
Figure 2:
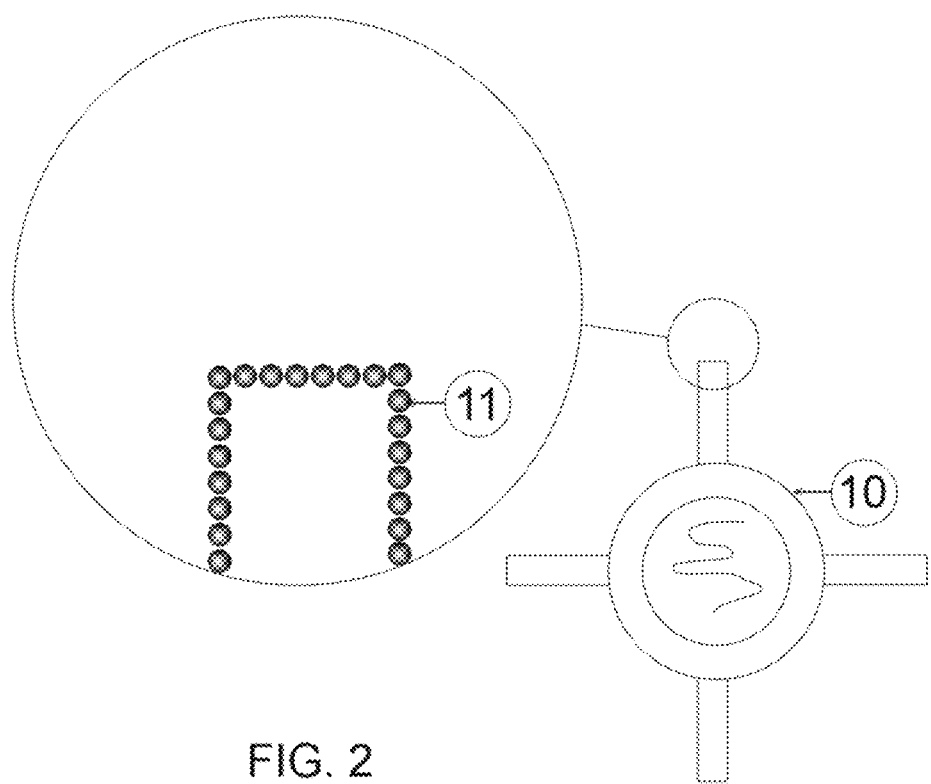
FIG. 2 represents how the figures created in space using the laser are constructed based on individual points of ionization that, when seen together with the rest, create the figure of interest.

The device for creating luminous signs in space comprises:
  means for generating energy so that the rest of the device can function (1) and, even though in the drawing they are represented in an unconnected form, they must be connected to all elements of the invention that require electrical energy to function.
  a visual and analytical subsystem (8) that observes the work environment and determines, according to defined parameters, after analysis of the images received, the spatial coordinates (x, y, z) from where to find the object to which it must supply the selected sign.
  a remote control subsystem (9) connected to the visual and analytical subsystem (8) on one side and to the subsystem for generating the sign (6) through a line of communication (7) commissioned to define the location of the luminous sign selected from the information obtained by the visual and analytical subsystem (8). This remote control subsystem (9) is commissioned to define the central point of coordinates (xc, yc, zc) in which the whole sign (10) to be represented must be generated.
  the sign generation subsystem (6) that receives orders from the remote control subsystem (9), in particular the coordinates of the central point (xc, yc, zc) where the sign (10) to be generated must be generated, is comprised of a set of points (11) of coordinates (xp, yp, zp) which must be drawn in the space, centred on the central point already indicated. As is obvious, (9) and (6) could be grouped in a single element and even integrated into the analysis system (8), in an implementation of the invention, eliminating the need for (7).

The sign generating subsystem (6) in turn controls:
  a laser (2) which must ionize all those points sequentially (xp, yp, zp) in a very short space of time so that the composition of all of them generates the desired image.
  mirrors (4) that are controlled by two galvanometric systems, allowing the laser beam to be moved in two coordinates (xp, yp). This concerns two mirrors that reflect the laser beam coming from (2) according to the electrical signal paths provided to them.
  a subsystem of lenses (3) to focus the laser beam on the coordinate (zp).

The signals for switching the laser on and off are sent to the laser (2) by the sign generation subsystem (6). The sign generation subsystem (6) also sends focus adjustment signals to the lens subsystem (3), also synchronized with the signals it sends to the engines that control the movement of the mirrors (4). These signals as a whole must be suitable so that these mechanisms move and thus aim the laser beam coming from (2) towards the different points where the corresponding ionization is generated.

As has been remarked upon, the laser (2) must be switched off and on when it sweeps the zone where the desired sign is to be generated at the time it is focussed on each point of interest in the space. In addition, the shorter the intervals between switching on and off, the less time they will provide energy to a potential object that may, erroneously, be at the point to be ionized, which would translate into a lesser threat of excessive heating of that point. Ideally the laser should be a Femtolaser (or close to it in frequency, whether above or below), with sufficient energy to be able to ionize the air according to the concentration provided by the focus lenses and considering the total of other possible lasers that could also focus on the same point.

By using several lasers focussed and targeting the same point in space to obtain more energy on the point to be ionized, there is less risk that one of them may, erroneously, heat up an element in the work environment too much. Likewise, using lasers of different colours provides different signs.

In this way all the points (xp, yp, zp) are generated which make up the image desired to be represented in the space and which create a figure directly in front of the recipient of this information (or in the spatial position desired) in order to notify them without them having to divert their eyes away from the work environment, or for similar advantages.

As is obvious this image must be refreshed periodically since the luminous effect produced by the ionization disappears in a short space of time.

Having sufficiently described the nature of the present invention, in addition to the manner in which to put it into practice, it is hereby stated that, in its essence, it may be put into practice in other embodiments that differ in detail from that indicated by way of example, and to which the protection equally applies, provided that its main principle is not altered, changed or modified.

What is claimed is:

1. A device for creating luminous signs in the space surrounding one or more vehicles comprising:
    a power supply for providing energy to the device;
    a visual and analytical subsystem configured to observe work environment and determine spatial coordinates (x, y, z), from where to find a target to which said visual and analytical subsystem must supply a selected sign, based on an analysis of images received; and
    a remote control subsystem connected to said visual and analytical subsystem on one side and a sign generation subsystem through a line of communication commissioned to define a location of said selected sign based on information received from said visual and analytical subsystem wherein said remote control subsystem is commissioned to define a central point of coordinates (xc, yc, zc) where said selected sign (10) must be generated;
    said sign generation subsystem receiving signals from said remote control subsystem with regard to said central point of coordinates (xc, yc, zc) is comprised of a set of points of coordinates (xp, yp, zp) drawn in the space and said central point of coordinates (xc, yc, zc) and wherein:
        said sign generating subsystem comprises:
            a laser configured to sequentially ionize all of said set of points of coordinates (xp, yp, zp);
            mirrors which allow said laser to be moved in two of said set of points of coordinates (xp, yp); and
            a subsystem of lenses to focus laser beam on one of said set of points of coordinate (zp).

2. The device for creating luminous signs in the space surrounding one or more vehicles according to claim 1, wherein said visual and analytical system is formed by two or more cameras with corresponding image sensors that generate a 3D image in said work environment and light directed at an area of interest to allow operations in conditions of low lighting, together with an analysis and control system that determines the distance to each of the sensor pixels of the different elements in said work environment to determine where said selected sign must be generated.

3. The device for creating luminous signs in the space surrounding one or more vehicles according to claim 2, wherein said visual subsystem comprises a combination of sensors or groups of sensors together with their respective lighting or pulse-generating elements and connected to an analysis and control subsystem whereby said sensor includes a ToF sensor together with a pulse-generating laser, a camera with a laser that generates structured light and a set of at least two cameras together with night lighting.

4. The device for creating luminous signs in the space surrounding one or more vehicles according to claim 1, wherein said visual and analytical system is formed by a ToF or flight time sensor and a pulse-generating laser, together with an analysis and control system that generates pulses of light with said laser and determines the distance to each of the sensor pixels of the different elements in the work environment to determine where said selected sign must be generated.

5. The device for creating luminous signs in the space surrounding one or more vehicles according to claim 1, wherein said visual and analytical system is formed by a camera and a laser that emits a structured light using a diffraction lens, which is then analyzed by an analytical subsystem that calculates, by triangulation, distance of objects in said work environment, transmitting said distance to said camera to determine the position to generate said selected sign.

6. The device for creating luminous signs in the space surrounding one or more vehicles according to claim 1, further including more than one laser used to ionize the surrounding space, with their respective lens elements and mirrors, as well as the control elements for positioning said mirrors.

7. The device for creating luminous signs in the space surrounding one or more vehicles according to claim 1, wherein said laser is a Femtolaser or superior, with sufficient energy to be able to ionize the air.

8. The device for creating luminous signs in the space surrounding one or more vehicles according to claim 1, wherein the vehicle receiving said selected sign is a receiver aircraft, in in-flight refuelling operations and in which said visual and analytical subsystem coincides with that employed by a tanker aircraft to determine the position of the receiver aircraft, said visual and analytical subsystem comprising a pair of cameras and an analysis and control system, a ToF or flight time sensor with an analysis and control system and/or a camera with a laser that emits structured light using a diffraction lens.

9. The device for creating luminous signs in the spacing surrounding one or more vehicles according to claim 8 wherein each one of said pair of cameras and said analysis and control system, said ToF or flight time sensor with said analysis and control system and/or said camera with said laser that emits structured light using said diffraction lens includes lighting elements or pulse generators.

* * * * *